United States Patent [19]
Morlion et al.

[11] Patent Number: 5,617,494
[45] Date of Patent: Apr. 1, 1997

[54] ALIGNMENT PIECE FOR A CONNECTOR FOR OPTICAL CONDUCTORS

[75] Inventors: Danny Morlion, St. Amandsberg; Luc Jonckheere, Dilbeek; Jan P. K. Van Koetsem, Zwijndrecht, all of Belgium

[73] Assignee: Framatome Connectors International, Paris, France

[21] Appl. No.: 524,230

[22] Filed: Sep. 6, 1995

[30] Foreign Application Priority Data

Sep. 8, 1994 [NL] Netherlands .............................. 9401459

[51] Int. Cl.⁶ ...................................................... G02B 6/36
[52] U.S. Cl. ............................................. 385/83; 385/137
[58] Field of Search ................................ 385/137, 98, 71, 385/52, 55, 65, 83

[56] References Cited

U.S. PATENT DOCUMENTS

| 4,028,162 | 6/1977 | Cherin et al. | 156/158 |
| 4,045,121 | 8/1977 | Clark | 385/65 |
| 4,289,558 | 9/1981 | Eichenbaum et al. | 156/179 |
| 4,952,263 | 8/1990 | Kakii et al. | 385/83 |
| 5,155,787 | 10/1992 | Carpenter et al. | 385/137 |
| 5,367,595 | 11/1994 | Jenning et al. | 385/65 |

FOREIGN PATENT DOCUMENTS

| 2367295 | 5/1978 | France . |
| 2626083 | 7/1989 | France . |
| 2272537 | 5/1994 | United Kingdom . |

*Primary Examiner*—John Ngo
*Attorney, Agent, or Firm*—Perman & Green

[57] ABSTRACT

An alignment piece (1, 9) for a connector for optical conductors (16) comprises a support plate (2, 10), a guiding plate (3, 11) made with very high accuracy and one or more alignment channels (4) for the conductors. The guiding plate (3, 11) has an end edge (5) in which the ends of the alignment channels are made as V-shaped slots (6) and the support plate (2, 10) is provided with an inclining guiding surface (8) in which the alignment channels (4) extend. The inclining guiding surface (8) of the support plate (2, 10) ends at a distance from the end edge (5) of the guiding plate (3, 11) wherein a support member (14, 20) is provided between this end edge and the guiding surface (8), which support member (14, 20) projects above the guiding surface (8). This support member (14, 20) supports the conductors (16) during introduction under such an angle of inclination that the conductors project above the end edge of the guiding plate (3, 11).

8 Claims, 3 Drawing Sheets

ALIGNMENT PIECE FOR A CONNECTOR FOR OPTICAL CONDUCTORS

BACKGROUND OF THE INVENTION

The invention relates to an alignment piece for a connector for optical conductors, comprising a support plate, a guiding plate manufactured with very high accuracy and one or more alignment channels for the conductors, said guiding plate having an end edge in which the ends of the alignment channels are made as V-shaped slots and wherein the support plate is provided with an inclining guiding surface in which the alignment channels extend.

Such an alignment piece is described in the earlier international patent application PCT/EP95/02403 of the same applicant. In an embodiment of this alignment piece wherein the guiding plate is mounted as a separate part on the support plate, a problem may occur during introducing the conductors, in that the ends of the conductors are stopped by an edge of the guiding plate.

The invention aims to provide an alignment piece of the above-mentioned type wherein this problem is overcome in an effective manner.

SUMMARY OF THE INVENTION

In the alignment piece according to the invention the inclining guiding surface of the support plate ends at a distance from the end edge of the guiding plate wherein a support member is provided between this end edge and the guiding surface, said support member projecting above the guiding surface and said support member being adapted to support the conductors during mounting the same in the alignment piece under such an angle of inclination that the conductors project above the end edge of the guiding plate.

In this manner problems during introducing the conductors in the alignment piece are avoided with certainty.

BRIEF DESCRIPTION OF THE DRAWINGS

The invention will be further explained hereinafter by reference to the drawings in which two embodiments are schematically shown.

DETAILED DESCRIPTION OF THE PREFERRED EMBODIMENTS

Figure 1:
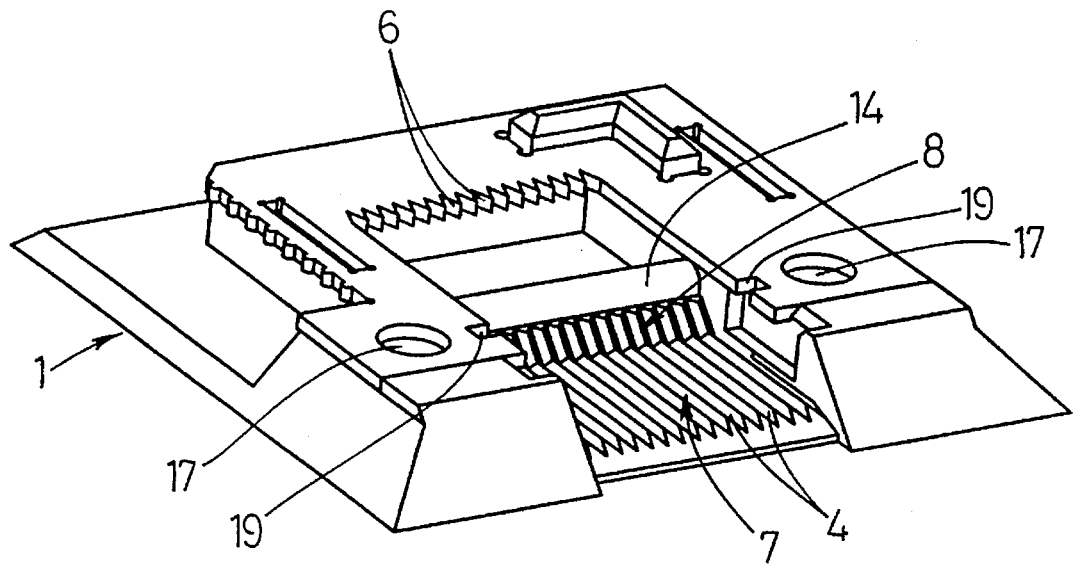
FIG. 1 shows a perspective view of an embodiment of the alignment piece according to the invention intended for embedding in a printed circuit board.

FIG. 1 shows a perspective view of an alignment piece 1 for a connector for optical conductors, not shown. This alignment piece is assembled of a support plate 2 and a guiding plate 3 attached thereon. The support plate 2 is made by usual techniques for example of plastic material and the guiding plate is made with very high accuracy for example of metal. A suitable technique resulting in a very high accuracy is for example the LIGA-technique. For a detailed explanation of the alignment piece 1 reference is made to the earlier international patent application PCT/EP95/02403 of the same applicant.

The alignment piece 1 comprises a plurality of alignment channels 4 for the conductors, wherein the guiding plate 3 includes an end edge 5 in which the ends of the alignment channels 4 are made as V-shaped slots 6. The remaining part of the alignment channels 4 is made in the support plate 2, namely in a guiding surface 7 and a joining inclining guiding surface 8.

Figure 2:
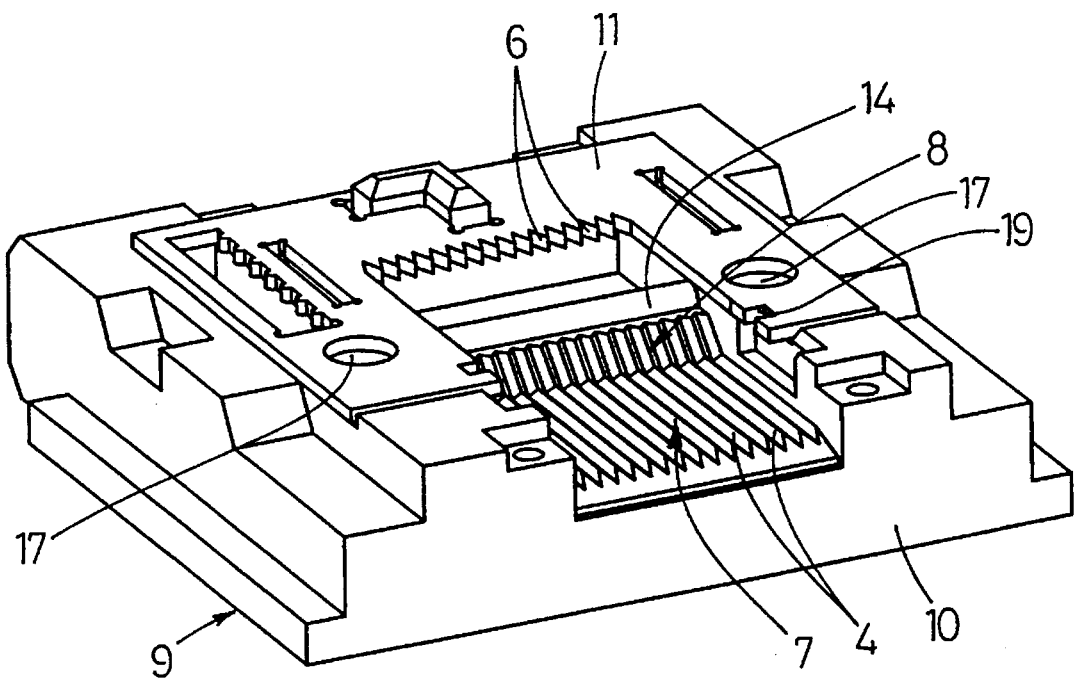
FIG. 2 shows a perspective view of an embodiment of the alignment piece according to the invention intended for a connector to be connected to a flat cable or a flexible printed circuit board.

The alignment piece 1 is intended to be embedded in a printed circuit board. FIG. 2 shows an alignment piece 9 which in the same manner as the alignment piece 1 is assembled of a support plate 10 and a guiding plate 11. The alignment piece 9 is intended for a connector to be connected to a flat cable or a flexible printed circuit board. The support plate 10 comprises a guiding surface 7 and an inclining guiding surface 8 in which the alignment channels 4 extend, while the ends of the alignment channels are made as V-shaped slots 6 in an end edge 5 of the guiding plate 11.

FIGS. 1 and 2 show that the inclining guiding surface 8 of the support plate 2, 10 ends at a distance from the end edge 5 of the guiding plate 3, 11. A first location 12 and a second lower location 13 are formed in the space between the inclining guiding surface 8 and the end edge 5 of the guiding plate 3, 11, as shown for the alignment piece 1 in cross-section in FIGS. 3–5.

Figure 3:
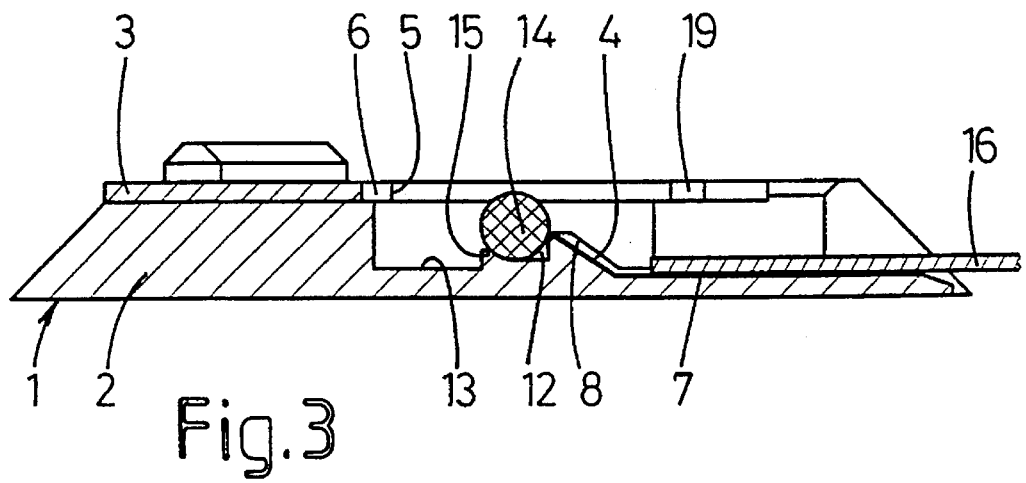
FIGS. 3–5 show the alignment piece of FIG. 1 in cross-section in successive steps during mounting the conductors in the alignment piece.
Figure 4:
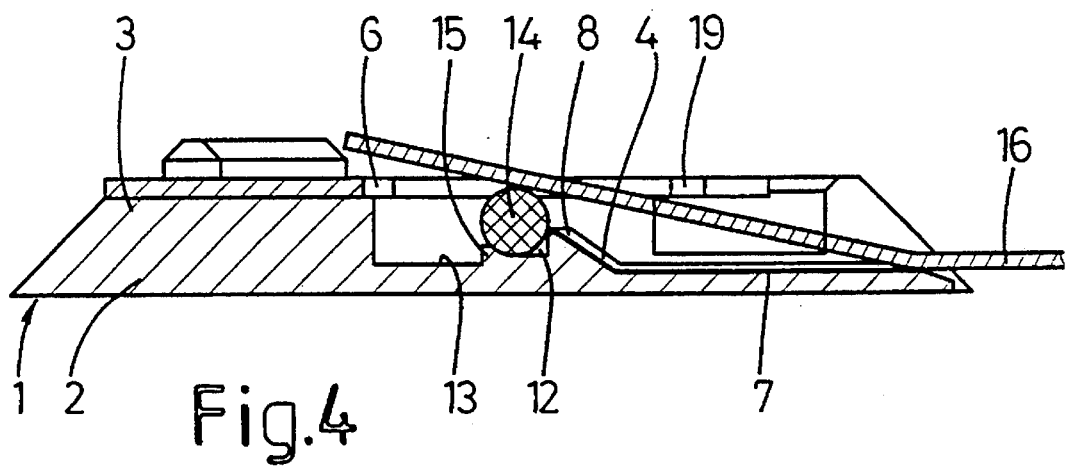

Before the conductors are mounted in the alignment piece 1, 9, a support member 14 which in this case is made as a round bar of plastic material, is lying on the first location 12 and a threshold 15 prevents that the support member 14 can easily move towards the location 13. For mounting the conductors in the alignment channels 4 the alignment piece 1 is placed on a wiring table, wherein positioning pins of the wiring table project into positioning holes 17 of the alignment piece 1 or 9, respectively. FIG. 3 shows a conductor 16 located in an alignment channel 4 of the guiding surface 7. As shown in FIG. 4 the conductor 16 is supported by the support member 14 projecting above the guiding surface 8, under such an angle of inclination that the conductor 16 projects above the end edge 5 of the guiding plate 3, 11. Thereby it is prevented with certainty that the conductors 16 are stopped by an edge of the guiding plate 3, 11 during introducing in the alignment channels 4. When all conductors 16 are mounted, the support member 14 is moved towards the location 13 over the threshold 15, whereby the conductors 16 become located in the V-shaped slots 6 in the end edge 5 of the guiding plate 3, 11. This situation is shown in FIG. 5.

Figure 5:
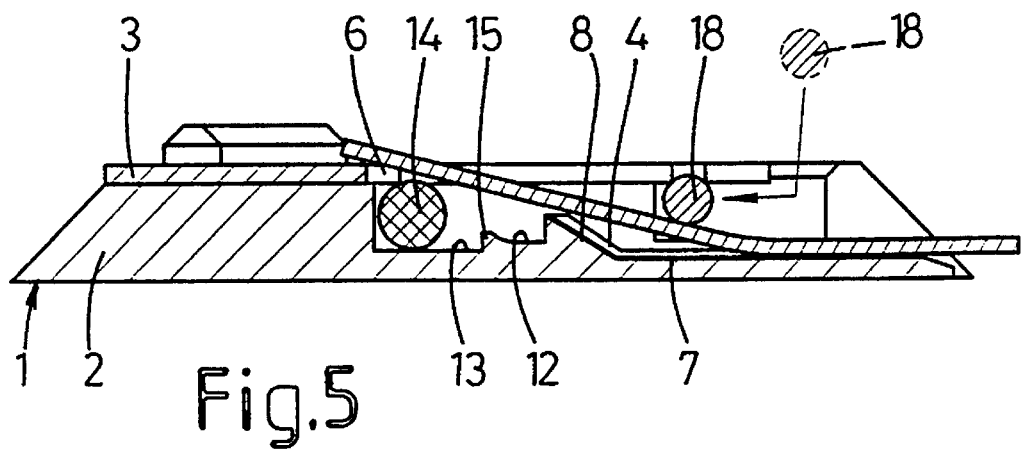

FIG. 5 further shows schematically a positioning element 18 made as a round bar. This positioning element 18 is mounted in the alignment piece 1, 9 and is held at an accurately predetermined location with respect to the end edge 5 of the guiding plate 3, 11 by recesses 19 in the guiding plate 3, 11. The positioning element 18 together with the end edge 5 determines the angle of inclination of the conductors 16 in the alignment piece 1, 9 as further described in a patent application of the same date of the same applicant.

In the embodiment of the alignment piece according to FIGS. 1–5 the support member 14 is made as a round bar which is detachably lying on the first location 12 and which is moved towards the second location 13 after mounting the conductors 16. It will be clear that other embodiments of the support member 14 are also possible. The support member 14 can for example be made with an area for supporting the conductors 16 under such an angle of inclination that the conductors project above the end edge 5 of the guiding plate 3, 11, wherein this supporting area can be lowered with respect to the end edge 5 after mounting the conductors 16. To this end the support meter can for example be mounted in a rotatable or retractable manner in the alignment piece 1, 9.

Figure 6:
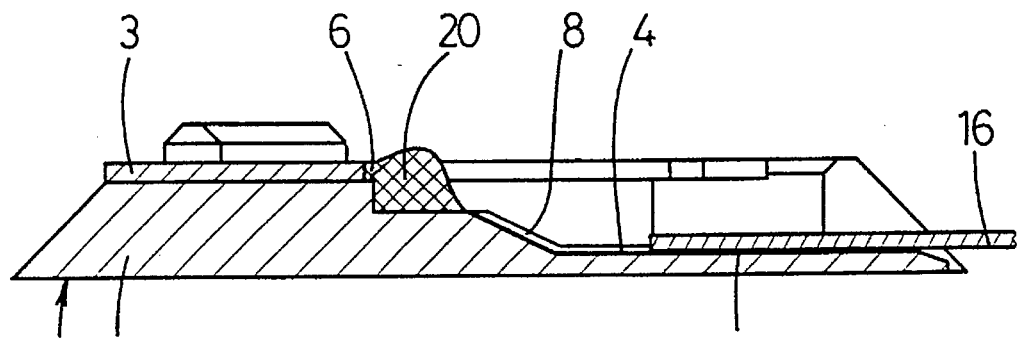
FIGS. 6–8 show cross-sections corresponding with FIGS. 3–5 of an alternative embodiment of the alignment piece according to the invention.
Figure 7:
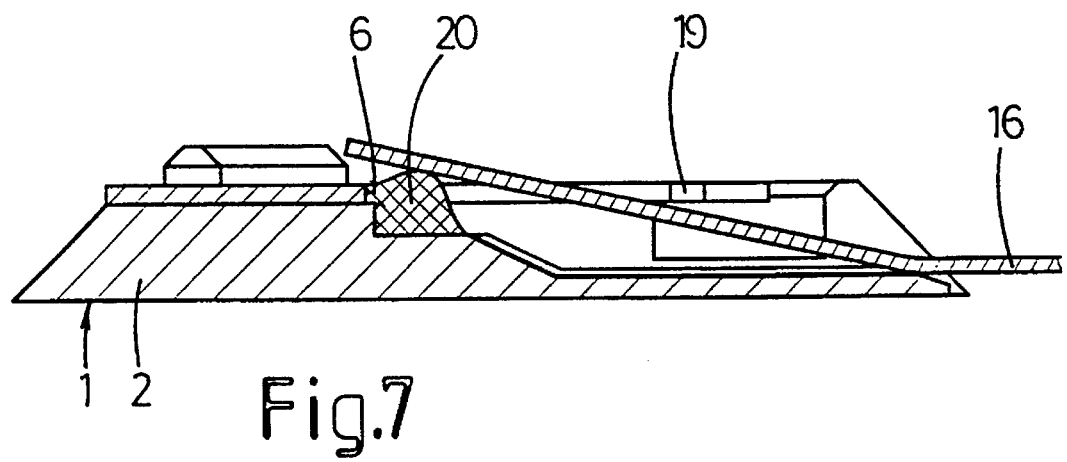
Figure 8:
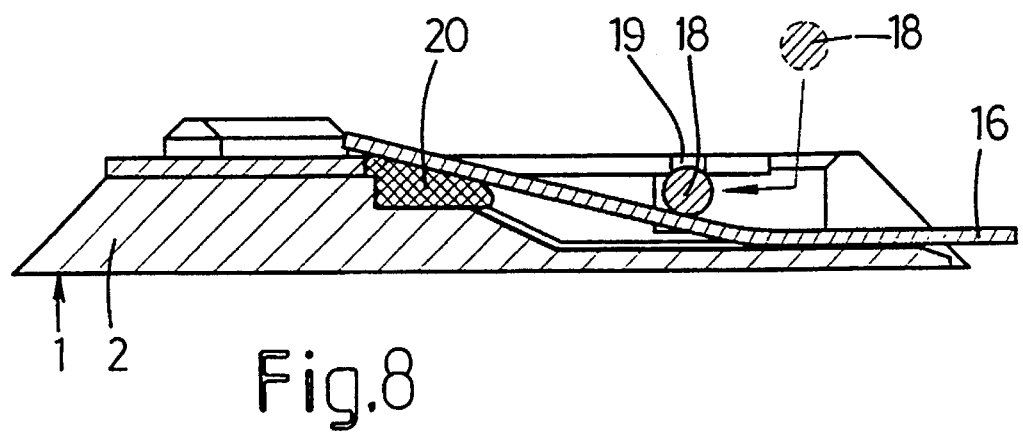

FIGS. 6–8 show an alternative embodiment of the alignment piece according to the invention, wherein a glue ridge 20 is provided between the inclining guiding surface 8 of the support plate 2, 10 and the end edge 5 of the guiding plate 3, 11. As appears from a comparison of FIGS. 6 and 7, this glue ridge 20 supports the conductors 16 under such an angle of inclination that the conductors project above the end edge 5 of the guiding plate 3, 11. When all conductors 16 are provided the glue ridge is melted, for example by heating, so that the conductors 16 will be located in the V-shaped slots 6 of the end edge 5. Further the positioning element 18 is placed in the recesses 19, so that the angle of inclination of the conductors 16 in the alignment piece is fixed accurately.

In the described embodiments of the alignment piece according to the invention the alignment piece comprises a support plate and a guiding plate made as separate parts. Within the scope of the invention it is however also possible to manufacture the alignment piece with support plate and guiding plate as a unit. When it is mentioned in the description and claims that the alignment piece is provided with a support plate and guiding plates these parts can therefore be made as a unit.

The invention is not restricted to the above-described embodiments which can be varied in a number of ways within the scope of the claims.

We claim:

1. Alignment piece for a connector for optical conductors, comprising a support plate with a top surface, a guiding plate manufactured with very high accuracy, said guiding plate being supported on the top surface of said support plate, and one or more alignment channels for the conductors, said guiding plate having an end edge in which ends of the alignment channels are made as V-shaped slots and wherein the support plate is provided with an inclining guiding surface in which the alignment channels extend, said inclining guiding surface of the support plate ending at a distance from said end edge of the guiding plate, wherein a support member is provided between this end edge and the guiding surface, said support member projecting above the guiding surface and said support member being adapted to support the conductors during mounting the same in the alignment piece under such an angle of inclination that the conductors project above said end edge of the guiding plate.

2. Alignment piece according to claim 1, wherein the support member has a supporting area adapted to be lowered.

3. Alignment piece according to claim 1, wherein the support member is retractable or rotatable.

4. Alignment piece according to claim 3, wherein the support member is made as a glue ridge which melts by heating for example.

5. Alignment piece according to claim 1, wherein the support member is detachably supported at a first location in the support plate.

6. Alignment piece according to claim 5, wherein a second lower location for the support member is provided in the support plate between the first location and said end edge of the guiding plate, wherein the conductors are located in the V-shaped slots in the end edge of the guiding plate when the support member is lying at the second location.

7. Alignment piece according to claim 6, wherein the first location is separated from the second location by a threshold.

8. An alignment piece for an optical conductor connector comprising:

a support plate having a top surface and an inclining guiding surface, the inclining guiding surface forming a portion of alignment channels for optical conductors;

a guiding plate attached to the top surface of the support plate, the guiding plate having an end edge with V-shaped slots, the end edge forming an end of the alignment channels and being spaced from the inclining guiding surface; and a support member located between the end edge of the guiding plate and the inclining guiding surface, the support member extending above the inclining guiding surface to support portions of optical conductors extending off of the inclining guiding surface in a location above the end edge of the guiding plate.

* * * * *